United States Patent
Greer

(10) Patent No.: US 7,546,508 B2
(45) Date of Patent: Jun. 9, 2009

(54) CODEC-ASSISTED CAPACITY ENHANCEMENT OF WIRELESS VOIP

(75) Inventor: Steven Craig Greer, Rowlett, TX (US)

(73) Assignee: Nokia Corporation, Espoo (FI)

( * ) Notice: Subject to any disclaimer, the term of this patent is extended or adjusted under 35 U.S.C. 154(b) by 517 days.

(21) Appl. No.: 10/740,863

(22) Filed: Dec. 19, 2003

(65) Prior Publication Data

US 2005/0137857 A1     Jun. 23, 2005

(51) Int. Cl.
  G08C 25/02   (2006.01)
  H04L 1/18   (2006.01)

(52) U.S. Cl. ............ 714/748; 714/749; 714/750; 709/231; 704/1; 375/220

(58) Field of Classification Search ......... 714/748–751; 704/1; 375/220; 709/224, 231
See application file for complete search history.

(56) References Cited

U.S. PATENT DOCUMENTS

| | | | | |
|---|---|---|---|---|
| 3,815,105 | A * | 6/1974 | Adkins et al. ............ | 710/264 |
| 4,594,591 | A * | 6/1986 | Burke ..................... | 340/3.9 |
| 4,914,654 | A * | 4/1990 | Matsuda et al. ........... | 370/522 |
| 5,768,527 | A * | 6/1998 | Zhu et al. ................. | 709/231 |
| 5,790,551 | A * | 8/1998 | Chan ....................... | 370/458 |
| 2001/0023465 | A1 | 9/2001 | Haneda et al. ............. | 710/126 |
| 2002/0106011 | A1* | 8/2002 | Fujii et al. ................ | 375/220 |
| 2003/0002501 | A1 | 1/2003 | Reme ...................... | 370/389 |
| 2003/0226094 | A1 | 12/2003 | Fukushima et al. ....... | 714/776 |
| 2003/0235196 | A1* | 12/2003 | Balachandran et al. ..... | 370/392 |

FOREIGN PATENT DOCUMENTS

| | | |
|---|---|---|
| EP | 0795991 A1 | 9/1997 |
| WO | WO-00/52873 | 9/2000 |
| WO | 02056544 * | 7/2002 |
| WO | WO-2004/002087 A2 | 12/2003 |

OTHER PUBLICATIONS

Whetten et al. 'An Overview of Reliable Multicast Transport Protocol II,' pp. 37-47, IEEE, Feb. 2000.*
Sunshine 'Efficiency of Interprocess Communications Protocols for Computer Networks,' pp. 287-293, IEEE, Feb. 1977.*
Miyamoto, S. et al., "A High-Quality Video Multicast Scheme with a Time Limit", IEEE Global Telecommunications Conference, Taipei, Taiwan, Nov. 17-21, 2002, vol. 1 of 3, pp. 1598-1602.

* cited by examiner

*Primary Examiner*—Guy J Lamarre
(74) *Attorney, Agent, or Firm*—Harrington & Smith, PC

(57) ABSTRACT

The use of a cellular system's packet data channel for transport of speech communications is enhanced by dynamically controlling the transmission of data packets that were received in error and notified to the transmitter by the receiver in accordance with an algorithm that takes into account a self-generated determination of the perceptual quality importance of the frame and is generated once for each frame by the speech encoder. The calculation of the frame importance is codec-dependent, and depends on a number of attributes associated with each particular frame, including the frame rate (for variable-rate codecs), signal classification, transition characteristics, background noise, previous frame erasures, etc. The selective reduction in transmission and retransmission increases the capacity of the cellular system while maintaining or even improving the quality of the received voice signal.

22 Claims, 3 Drawing Sheets

CODEC-ASSISTED CAPACITY ENHANCEMENT OF WIRELESS VOIP

TECHNICAL FIELD

The field of the invention is the use of a wireless or other system for transport of speech or other real-time communications.

BACKGROUND OF THE INVENTION

In today's cellular networks, speech communication over the air interface is conveyed through circuit-switched links, or channels, that are reserved for the duration of the call. In the future, all data transfer, including voice communications, will be conveyed using packets of information transported over connectionless links. For the case of voice communications, this is known as Voice over Internet Protocol (VoIP).

A fundamental trade-off between speech quality and system capacity exists in all cellular networks. An increase in one results in a decrease in the other, other things being equal. Improvements are made when either the speech codec is made more efficient in compressing speech, resulting in higher system capacity and/or improved voice quality, or the air interface itself is improved, again resulting in higher system capacity.

Increases in system capacity and improvements in voice quality in the past have been made by independently improving the speech codec and the air interface that transports its encoded frames. As an example, in cdma2000®, the IS-127 speech codec standard has been supplanted with the IS-893 standard. Through improvements to the air interface, Revision 0 of cdma2000 significantly increased the capacity of the system over that of IS-95 and its revisions. These standards revisions reflect major upgrades to cdma2000 equipment. This invention can enable further improvements in addition to and complementary to these approaches.

The use of feedback from the decoder to the encoder, in addition to the establishment of a link between the codec and the channel that transports its output, opens the door for further optimization of the trade-off between cellular system capacity and voice quality without impacting the fundamental operation of either the speech codec or the channel that carries its encoded frames. The transition of voice communications from a circuit-switched channel to a packet-switched channel provides an opportunity for introducing these improvements.

The cdma2000 air interface standard now defines a packet data channel for use in transporting packets of data over the air interface. This packet data channel is optimized for transporting high-speed bursts of delay-insensitive data with very low probability of error through repeated retransmission if necessary. It is assumed that all packets are equally important and that all are essential.

Conversely, the attributes of data representing speech include low speed, non-burstiness, delay sensitivity and error tolerance. It is known that not all packets are perceptually equivalent. These unique attributes of speech are not taken into specific account by the design of the packet data channel. Thus, the current systems utilize extra resources and therefore reduce throughput by retransmitting packets that are not necessary.

While the cdma2000 packet data channel can be used as defined to transport speech information, improvements can be made by taking into account the specific nature of speech in addition to linking the specific application, speech coding, to the channel that transports the encoded speech.

Current cellular systems convey speech through circuit-switched connections. There is no inter-layer communication in place between the speech codec and the circuit-switched channel that transports the codec's encoded frames of information. In addition, there is no feedback from the speech decoder to the speech encoder.

SUMMARY OF THE INVENTION

The invention relates to a system that transmits speech data over a packet network in a manner that permits packets to be dropped when advantageous.

A feature of the invention is a speech importance unit that provides to the packet data controller an indication of the relative importance of a frame of speech data.

A feature of the invention is the provision of feedback to a transmitter permitting the dropping of packets of less importance.

Another feature of the invention is the generation by the speech encoder of an indication of the perceptual quality importance of the frame.

Yet another feature of the invention is the dependence of the perceptual quality importance of the frame on the rate of the current frame and the frame error history.

Yet another feature of the invention is a frame importance indicator quantized to N levels.

Yet another feature of the invention is a frame importance indicator dependent on at least two input quantities including at least two of the frame importance, the error rate and the system capacity.

BEST MODE OF CARRYING OUT THE INVENTION

Figure 3:
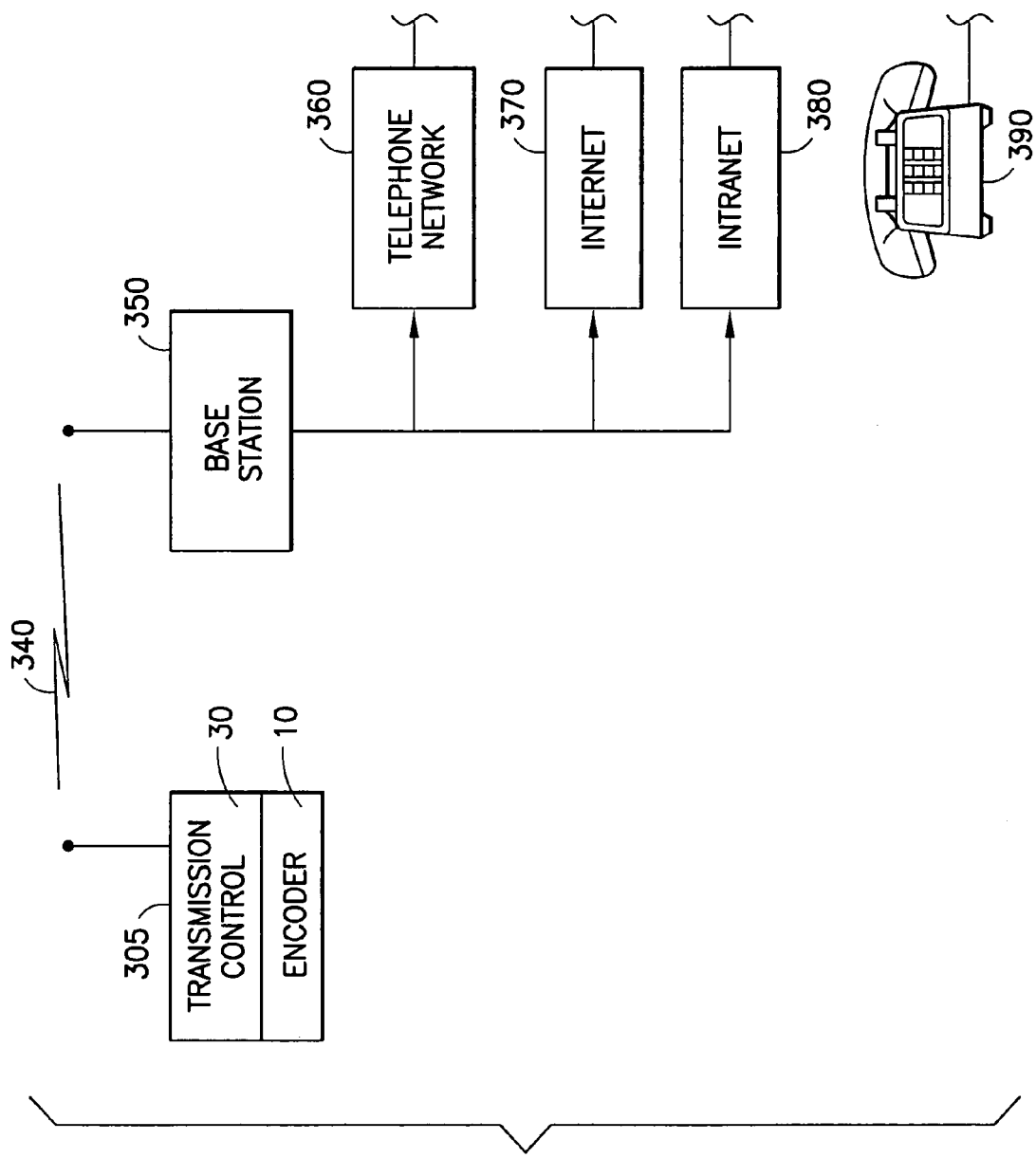
FIG. 3 illustrates an overall view of a system incorporating the invention.

FIG. 3 illustrates schematically a system employing the invention and including a mobile telephone handset 305 having a transmission control 30 arid an encoder 10, along with the usual microphone, battery, speaker, RF transmitter, etc., which conventional elements are included schematically in the representation 305. An arrow 340 represents RF transmission of signals between the handset and the base station 350 for the particular cell in which the handset is located.

As discussed above, systems according to the present invention selectively suppress retransmission of packets. Since the air interface is usually the most restrictive portion of a system, suppression of re-transmission here will usually be the most effective in improving capacity.

This invention defines a speech frame importance indicator that provides to the scheduler of a packet data channel an indication of the relative importance of a frame of speech data. This indicator is a self-generated determination of the perceptual quality importance of the frame and is generated once for each frame by the speech encoder. The calculation of the frame importance is codec-dependent, and can depend on a number of attributes associated with each particular frame, including the frame rate (for variable-rate codecs), signal classification, transition characteristics, background noise, etc.

Referring back to FIG. 3, base station 350 is connected in a conventional arrangement with a telephone network 360 that connects, along with many other possibilities, with a corresponding customer handset 390 which may be a wired set or may be another mobile handset.

Optional boxes 370 and 380, labeled Internet and Intranet, respectively indicate that the call may pass over the Internet or a private network using the Internet protocol (an Intranet). In the illustrative embodiment, the speech is coded in packets using the VoIP system, so that the overall system may use the conventional phone network and/or the Internet or Intranet.

For example, base station 350 may be part of a conventional arrangement in which the user has an account with a mobile service provider that supplies base stations and connections between the base stations and the local phone company. The call in question may be routed over the phone network to any user of set 390 that can be connected to the phone network. In a variation, the user being called may be a co-worker of the sender and connected to the same Intranet maintained by the employer of the sending and receiving parties.

In another variation, the user may choose to route his call over the Internet, in which case, the speech data would be sent over the local phone company's equipment to an access number of the sending party's Internet Service Provider and then over the Internet. Handset 390 may be connected to the receiving party's modem or to the local phone company in the receiving party's location.

The foregoing illustrates an advantageous feature of using the VoIP system, in that additional flexibility is provided for routing calls.

Figure 1:
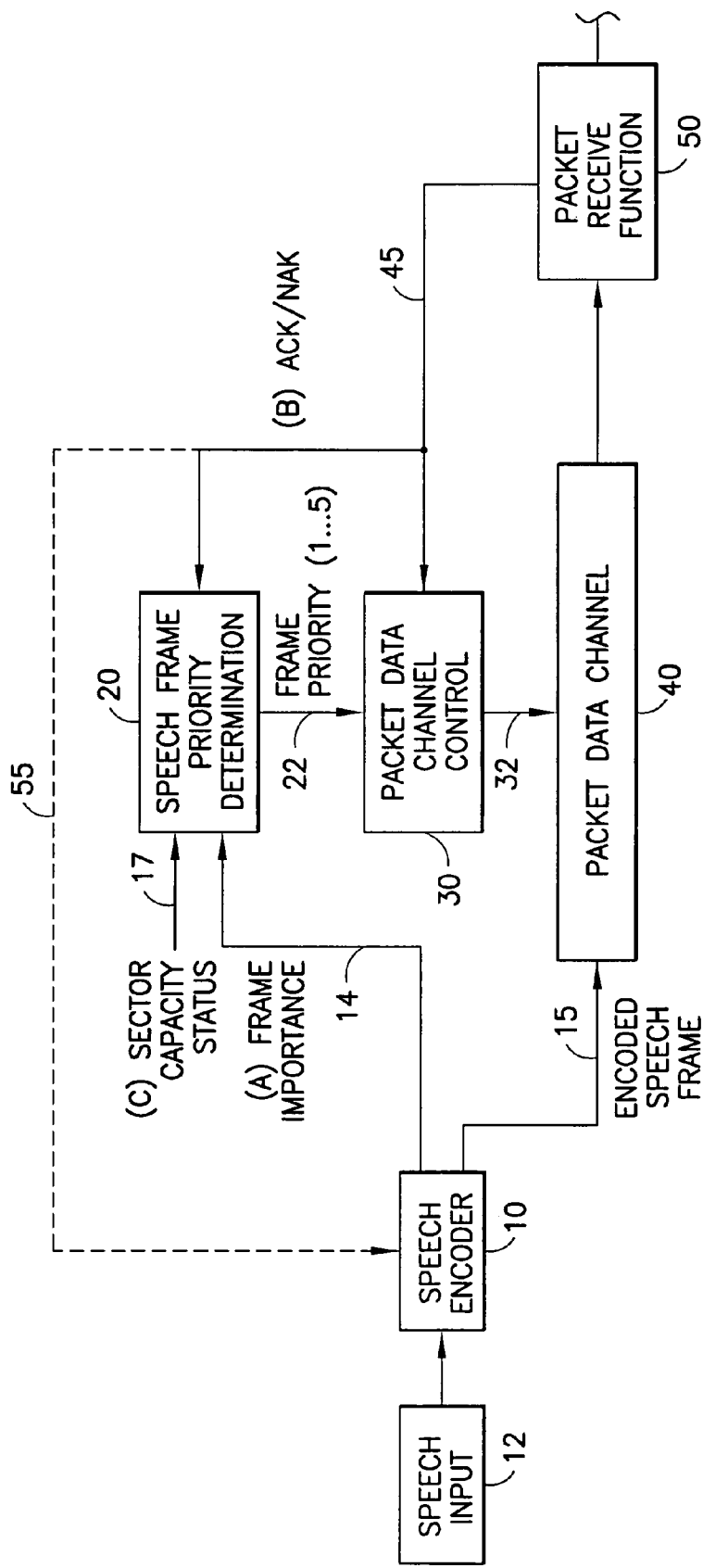
FIG. 1 illustrates a portion of a system incorporating the invention.

FIG. 1 illustrates a portion of the system of FIG. 3, showing portions of handset 305 and of base station 350. On the left, microphone 12 sends signals representing speech by the user to speech encoder 10. Encoder 10 sends signals out, a conventional signal on line 15 to packet data channel 40. Box 40 is a representation of the RF transmitter/receiver, etc that are represented in FIG. 3 by arrow 340. On the right of FIG. 1, box 50 represents part of base station 350 that receives packets (including e.g. RF receiver, demodulator, decoder, etc.) and sends back an ACK/NAK signal on line 45 to box 30 described below. The signal on line 45 may additionally include a processed signal representing the frame error rate for that particular handset averaged over an appropriate period of time to give an indication of the various factors that can affect signal transmission, such as obstacles in the signal path, noise in the environment, heavy or light loading of the system capacity by other handsets, etc. The processing may be done where convenient—in the base station 350 or in other apparatus of the mobile service provider, which would have easier access to data from other base stations. Preferably, the data are those most relevant to the channel being used by handset 305.

In the center of FIG. 1, box 30 controls the packet transmission along the packet channel, using conventional functions such as timing, power control and the like, and also selectively suppressing the retransmission of packets that are deemed not worth retransmitting. This feature represents a significant departure from the design of conventional packet systems that are set up to re-transmit packets until they are successfully received or a timeout limit is reached.

In FIG. 1, box 50 is in the receiver, box 40 represents the channel and the other units are located in the transmitter. There will be corresponding functional units in both the base station and the mobile handset, since both of them transmit and receive. The corresponding units need not be identical, since the handset will be generally made by a different manufacturer from the one supplying the base station and also since the power and weight of the handset are limited.

Box 30 has as input the ACK/NAK signal from receiver 50. The NAK signal acts as a control to the retransmit function; and an input on line 22 from the priority determination unit 20 that receives a number of inputs, in the illustrative case three, that represent a) the importance of a particular frame, as calculated by encoder 10 and sent along line 14; b) the ACK/NAK signal and/or the error rate signal from receiver 50; and c) the sector capacity status, coming in along line 17 from means not shown in the base station 350 that keeps a running tally of the system load compared with the system capacity.

When the system is lightly loaded, operation is not significantly impacted by retransmitting packets until they are successfully received. When the system is heavily loaded, overall quality of transmission for other users can be improved by not transmitting less important packets that do not contribute significantly to the quality of the speech being transmitted because the decoder can perform error concealment.

Thus, by discarding low-priority frames, the speech quality of all users may be enhanced by reducing congestion and permitting the retransmission of the most important frames of speech.

The currently defined cdma2000 service options for speech are circuit-switched. Speech frames are encoded and transmitted to the receiver while the cdma2000 system controls the transmitted power such that approximately 1% of the frames are received in error. The transmitting end, specifically the speech encoder, has no knowledge of the specific frames received in error by the speech decoder. In addition, all speech frames are considered equally important by the cdma2000 air interface that transports them. The cdma2000 packet data channel is designed to deliver packets of data with high reliability through (if necessary) repeated transmissions of the packets. This retransmission of packets reduces the capacity of the cellular system. While retransmission is necessary for many types of data, (loss sensitive, delay insensitive), this is not necessarily the case for speech data.

The use of the packet data channel for the transmission of speech data allows, in contrast to circuit switched systems, the ability of the receiving end of the speech channel to signal to the transmitting end whether the speech frame was received correctly or not, for example, the ACK/NAK feedback associated with a cdma2000 packet data channel.

This feedback is used in conjunction with the frame importance indicator from the speech encoder to determine whether an encoded speech frame needs to be retransmitted, or even if it is necessary to transmit the speech frame at all. In other words, if a codec is allowed to, within some limits, choose the frames that can be lost, even larger frame error rates can be tolerated. This selective reduction in transmission and retransmission increases the capacity of the cellular system while maintaining or even improving the quality of the received voice signal. Additionally, the ACK/NAK signal can be used by the speech encoder itself to make decisions on how to encode speech based upon knowledge of the error conditions at the decoder.

In summary, a significant concept of this invention is the definition of a frame importance indicator calculated by the speech encoder, and the use of this frame importance indicator in conjunction with the feedback from that channel to make decisions about the transmission or retransmission of the packets in an effort to improve system capacity, and/or speech quality. Specifically, the application itself (the speech codec) provides information to the air interface about the relative perceptual importance of each of the encoded frames. This concept involves the use of feedback from a speech decoder to the encoder along with interlayer communication from the application (speech codec) to the packet data channel.

Current speech codecs designed for cdma2000 systems are variable-rate in nature. Each frame of speech (or silence) is encoded into one of four rates, corresponding to the cdma2000 circuit-switched rate sets they were originally designed for. As an example, full-rate frames convey more information than eighth-rate frames, and in general result in greater speech quality degradation if received in error. Eighth-rate frames are used to encode background noise when the speaker is silent. A higher error rate of these frames typically can be tolerated.

Another factor is that frames of encoded speech, from a perceptual speech quality sense, can differ in importance, even if they are of the same rate. This somewhat codec-dependant attribute can only be quantified at the speech encoder. That is, there exists the possibility for the speech encoder to provide a quantitative measure of the relative importance of a frame of encoded speech that is created. In an error-prone channel, such as a cellular system, the quality of the received speech depends not only on the intrinsic quality of the encoded speech, but also the frame error rate of the received frames as well as the distribution of the frame errors. Bursts of frame errors are far more deleterious than random errors but, unfortunately, are more common in cellular systems. Speech decoders designed for error-prone environments include error concealment algorithms, designed to handle small bursts of errors. Longer bursts are more problematic.

Therefore, the perceptual importance of a frame of speech that is to be transmitted depends on the following factors: A) A codec-specific determination of the importance to overall intrinsic speech quality of each specific frame of encoded speech (known by the speech encoder). Note that for variable-rate codecs, this frame importance is also a function of the rate of the current frame. In general, the higher the frame-rate the more information being transmitted and the more valuable the frame; and B) A frame error history (rate, burstiness, specific frames in error) of the speech frames that were declared in error by the cdma2000 receive end (until now, known only to the receiver).

Additional useful and available information includes: C) the loading of the particular sector of the cellular system. If the sector is lightly loaded, there is less of an urgency to reduce packet transmissions/retransmissions. If the sector is overloaded, there is more of an urgent need to reduce transmissions and retransmissions of packets. As shown in FIG. 1, these three inputs are processed to generate, for each encoded speech frame, a frame priority. The Speech Frame Priority Determination module performs this processing.

An example follows: Each of the three inputs (A, B, C) to the Speech Frame Priority Determination module is quantized to five levels. Regarding the frame quality importance (A), in general, the design will be specific to each codec. Inputs to the decision will include the frame rate, the classification of the signal (voiced, unvoiced, etc), transition characteristics of the current frame compared with the previous frame, background noise stationarity, etc.

The output will be a frame importance indicator quantized to 5 levels, with 1 representing the least important and 5 representing the most important. The ACK/NAK error rate feedback (B) could be processed as follows:

Error rate is significantly below the set point AND there is no recent or present burst of errors.

Error rate is somewhat below the set point AND there is no recent or present burst of errors.

Error rate is at the set point AND there is no present burst of errors.

Error rate is somewhat above the set point OR there is a recent but not present burst of errors.

Error rate is significantly above the set point OR there is a recent or present burst of errors.

Regarding the sector capacity (C), the loading of the current sector is quantized to 5 levels, with 1 representing system outage (i.e. capacity below some low threshold) and 5 an unloaded system.

The frame importance can then be calculated as max (A, B, C) and assume one of five values. The frame importance value is then input to the scheduler to prioritize the frame for transmission. The five values can take on the following meanings as follows:

Do not transmit the frame at all; b) Transmit the frame at low priority (as determined by the scheduler) with no retransmission attempts; c) Normal priority for transmission of the frame with limited retransmission attempts; d) Normal priority for transmission of the frame with retransmission attempts until timeout; and e) High priority for transmission including retransmission attempts until timeout.

FIG. 1 was drawn for simplicity to show an asymmetric situation in which the receiver (in the base station) is located on the right and the transmitting and selection functions on the left (in the handset). Those skilled in the art will be aware that there is also a problem of failed packets received by the handset. The base station has much more power available to it, but the handset may be located in a region where the signal from the base station is weak, so that frames from the base station contain errors.

Thus, FIG. 1 should be interpreted as representing the situation from one point of view and there is also a benefit from applying the invention to transmissions from the base station to the handset.

Further, the invention is not confined to an inherently asymmetric situation such as handset—base station and may be applied to any error-prone channel with feedback. In addition, the invention is not confined to speech and other real-time communications such as video, may benefit from it.

Figure 2:
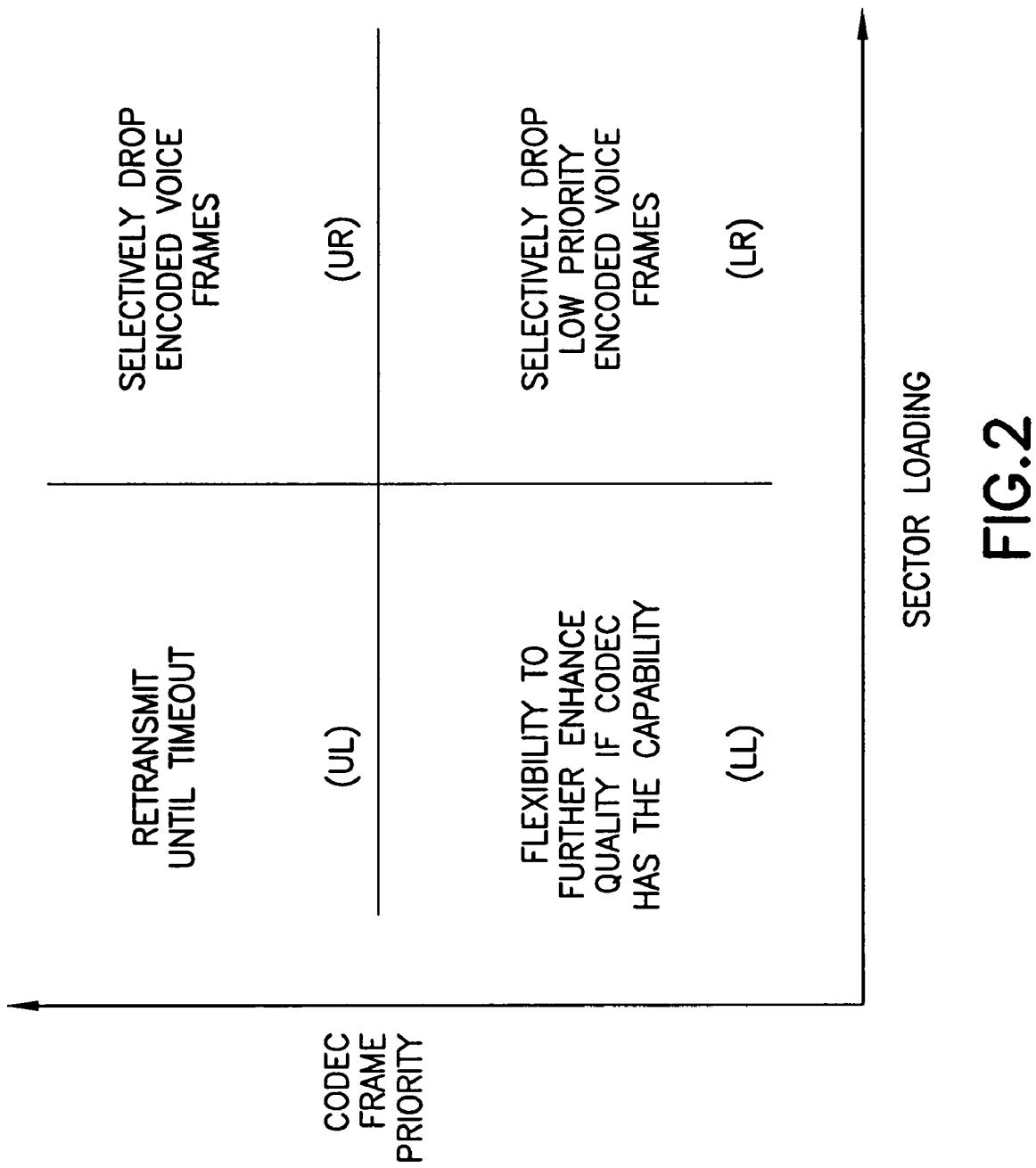
FIG. 2 illustrates a map of the various categories of priority.

An alternative approach, as shown in FIG. 2, is to form a codec frame priority function of inputs A and B and plot vs. the sector capacity (C). The appropriate quadrant defines the approach to take by the scheduler.

Thus, the y-axis is the priority function, such as that sent on line 22 in FIG. 1, and the x-axis is the sector capacity sent on line 17 in FIG. 1. FIG. 2 shows the results grouped for illustration in four quadrants. On the left side, the system is lightly loaded and the threshold for retransmission is relatively low. In the UL quadrant, when the channel is lightly loaded and the frame is high priority, a bad frame is retransmitted until it succeeds in getting through or reaches the system timeout. On the lower level, the LL quadrant permits the system to enhance speech quality by retransmitting, even if the frame in question is not too important.

On the right side, the system is relatively heavily loaded and the threshold for retransmission will be higher than on the left. In the UR quadrant, the channel is heavily loaded. Thus, only the highest priority frames will be retransmitted. Even though a packet has relatively high priority, it is not retransmitted even though a NAK signal was sent to the transmitter. As discussed before, the criterion for channel loading will be some finite value of usage (a number of users competing for the scarce resource of transmission time), not that the equipment has broken down.

In the LR quadrant, the system is also busy and the frame is less important, so that the overall system capacity is increased by degrading the speech of all users in order to permit all users to transmit with at least reasonably acceptable quality.

The selection of a dividing line between lower-priority packets that may be dropped and higher-priority packets will depend on a judgment call by the system designer or operator. It is expected that the dividing line of packet importance between packets that are dropped and those that are retransmitted will be different between the right side and the left side of FIG. 2. The dividing line need not be fixed and may change with circumstances, such as system loading.

Finally, also shown in FIG. 1, there can exist an optional feedback line (shown as dotted line 55) of the packet data channel ACK/NAK directly to the speech encoder itself. This feedback would be taken into account in the design of the speech codec's algorithms to take into account knowledge of the specific frames in error to further improve the robustness and quality of the encoded speech.

A speech encoder can be designed to take advantage of known frame erasures at the speech decoder. In such an approach, speech frames are encoded in a way such that recovery from frame erasures at the decoder is improved. When frame erasures are not occurring at the decoder; i.e. when transmission conditions are good, the speech frames can be encoded with an algorithm that provides better voice quality with less concern for error recovery. This feedback can also be used by the speech encoder to provide a dynamic frame priority list that depends on the FER conditions at the receiver.

In the past, the encoder did not have a feedback input. In a system according to the invention, a feedback signal (e.g. a signal, as in the previous example, that several previous packets had just failed) will affect the importance assigned to the current packet. The failure of several consecutive frames is referred to as a burst of errors, with a threshold that is set by the system designer. This may be referred to as a user priority change, since it may be a random effect that affects only one user.

Also, if an average frame error rate over all users is greater than some value, the threshold for re-transmission is changed to drop more low-priority packets for all users. This may be referred to as a system effect since it affects all users to the same degree.

Although the invention has been described with respect to a limited number of embodiments, those skilled in the art will appreciate that other embodiments may be constructed within the spirit and scope of the following claims.

I claim:

1. A method comprising:
   determining a perceptual quality importance of a data frame of speech data, where the perceptual quality importance indicates the importance of the data frame to perception of the speech data;
   outputting from an encoder an encoded data frame in conjunction with an indication of the perceptual quality importance of the encoded data frame;
   transmitting said encoded data frame to a receiver;
   and selectively suppressing retransmission of the encoded data frame in accordance with the indication of the perceptual quality importance and in conjunction with feedback from the receiver, where the method is performed by a single device.

2. The method of claim 1, where the indication of the perceptual quality importance is quantized to N levels, where N>1.

3. The method of claim 1, where selectively suppressing retransmission of the encoded data frame in accordance with the indication of the perceptual quality importance and in conjunction with feedback from the receiver is further performed in conjunction with an indication of current system loading.

4. The method of claim 3; wherein the indication of current system loading comprises a sector capacity status factor and is a function of data transfer capacity.

5. The method of claim 1, where selectively suppressing retransmission of the encoded data frame in accordance with the indication of the perceptual quality importance and in conjunction with feedback from the receiver is further performed in conjunction with an indication of error history.

6. The method of claim 1, where the encoder is comprised of a speech encoder, and where the perceptual quality importance is based on at least one of signal classification, transition characteristics and background noise.

7. A computer program product embodied on a computer readable storage medium and comprising program instructions the execution of which results in operations that comprise:
   determining a perceptual quality importance of a data frame of a speech signal, where the perceptual quality importance indicates the importance of the data frame to perception of the speech signal;
   outputting from an encoder an encoded data frame in conjunction with an indication of perceptual quality importance of the encoded data frame;
   transmitting said encoded data frame to a receiver; and
   selectively suppressing retransmission of the encoded data frame in accordance with the indication of perceptual quality importance and in conjunction with feedback from the receiver, where a single device comprises the computer readable storage medium.

8. The computer program product of claim 7, where the indication of the perceptual quality importance is quantized to N levels, where N>1.

9. The computer program product of claim 7, where selectively suppressing retransmission of the encoded data frame in accordance with the indication of the perceptual quality importance and in conjunction with feedback from the receiver is further performed in conjunction with an indication of current system loading.

10. The computer program product of claim 7, where selectively suppressing retransmission of the encoded data frame in accordance with the indication of the perceptual quality importance and in conjunction with feedback from the receiver is further performed in conjunction with an indication of error history.

11. The computer program product of claim 7, where the encoder is comprised of a speech encoder, and where the perceptual quality importance is based on at least one of signal classification, transition characteristics and background noise.

12. An apparatus, comprising:
   a speech encoder configured to determine a perceptual quality importance of a data frame of speech data, where the perceptual quality importance indicates the importance of the data frame to perception of the speech data, and having an output to provide frames of encoded speech data and, in conjunction with each frame, an indication of the perceptual quality importance of the encoded speech data that comprises the frame;

a transmitter having an input coupled to the output of said speech encoder to transmit the frames of encoded speech data to a receiver; and a retransmission unit adapted to selectively suppress retransmission of individual ones of the frames of encoded speech data in accordance with a corresponding one of the indications of the perceptual quality importance and in conjunction with feedback from the receiver.

13. The apparatus of claim 12, where the indication of perceptual quality importance is quantized to N levels, where N>1.

14. The apparatus of claim 12, where said retransmission unit is further responsive to an indication of communication system loading.

15. The apparatus of claim 12, where said retransmission unit is further responsive to an indication of error history.

16. The apparatus of claim 12, where perceptual quality importance is based on at least one of signal classification, transition characteristics and background noise.

17. The apparatus of claim 12, where said frames of encoded speech data are transmitted as data packets in a voice over internet protocol (VoIP) communication system.

18. A device, comprising:

means for encoding speech and comprising a means for determining a perceptual quality importance of a frame of encoded speech data, where the perceptual quality importance indicates the importance of the data frame to perception of the speech data, and an output to provide frames of encoded speech data and, in conjunction with each frame, an indication of the perceptual quality importance of the encoded speech data that comprises the frame;

means for transmitting the frames of encoded speech data to a receiver; and means for selectively retransmitting frames of speech data to the receiver and adapted to selectively suppress retransmission certain individual ones of the frames of encoded speech data in accordance with a corresponding one of the indications of perceptual quality importance and in conjunction with feedback from the receiver.

19. The device of claim 18, where the indication of the perceptual quality importance is quantized to N levels, where N>1.

20. The device of claim 18, where said retransmission means is further responsive to at least one of an indication of current system loading and an indication of error history.

21. The device of claim 18, where the perceptual quality importance is based on at least one of signal classification, transition characteristics and background noise.

22. The device of claim 18, where said frames of encoded speech data are transmitted as data packets in a voice over internet protocol (VoIP) communication system.

* * * * *